United States Patent [19]
Fuhrman

[11] 3,949,838
[45] Apr. 13, 1976

[54] BICYCLE WITH SELF-ALIGNING DISC BRAKES

[75] Inventor: Delmar L. Fuhrman, Kettering, Ohio

[73] Assignee: The Huffman Manufacturing Company, Miamisburg, Ohio

[22] Filed: Apr. 11, 1974

[21] Appl. No.: 459,869

[52] U.S. Cl. .................................. 188/26; 188/72.2
[51] Int. Cl.[2] .......................................... B62L 5/00
[58] Field of Search ............ 188/24, 26, 72.2, 72.3, 188/72.1, 73.6, 73.3, 72.9

[56] References Cited
UNITED STATES PATENTS

| | | | |
|---|---|---|---|
| 2,612,968 | 10/1952 | Hood .................................... | 188/26 |
| 3,003,589 | 10/1961 | Desbrow .............................. | 188/72.9 |
| 3,207,267 | 9/1965 | Beuchle et al. ..................... | 188/72.2 |
| 3,318,420 | 5/1967 | Adams ................................. | 188/72.3 |
| 3,655,015 | 4/1972 | Mennesson ......................... | 188/26 |
| 3,675,741 | 7/1972 | Frei et al. ............................ | 188/26 |
| 3,680,663 | 8/1972 | Kine ..................................... | 188/24 |

FOREIGN PATENTS OR APPLICATIONS

| | | | |
|---|---|---|---|
| 863,150 | 3/1961 | United Kingdom ............... | 188/72.3 |
| 74,962 | 6/1946 | Norway .............................. | 188/24 |

*Primary Examiner*—Trygve M. Blix
*Assistant Examiner*—Edward R. Kazenske
*Attorney, Agent, or Firm*—Biebel, French & Bugg

[57] ABSTRACT

A bicycle with a disc brake includes a brake mounting bracket attached to the bicycle frame and restrained against movement about the axle of the wheel with which the brake is associated during braking action. The brake pads are mounted on an actuator and the actuator is supported by a carrier. The carrier and the mounting bracket are interconnected by a loose connection that permits floating movement of the carrier, actuator and brake pads with respect to the mounting bracket and brake disc to accomodate distortion of the brake disc, assembly tolerances and mispositioning of the brake pads with respect to the disc.

2 Claims, 5 Drawing Figures

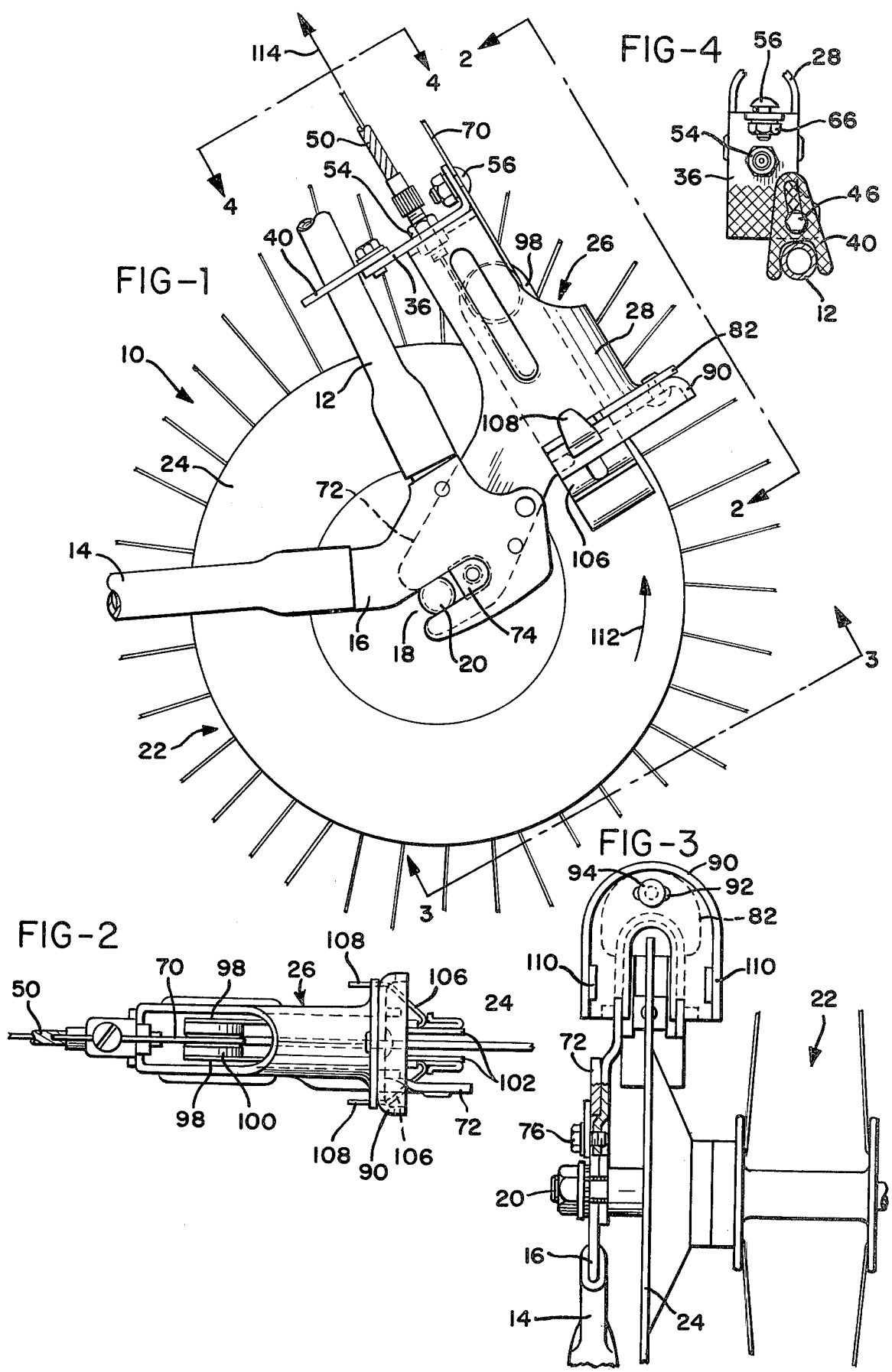

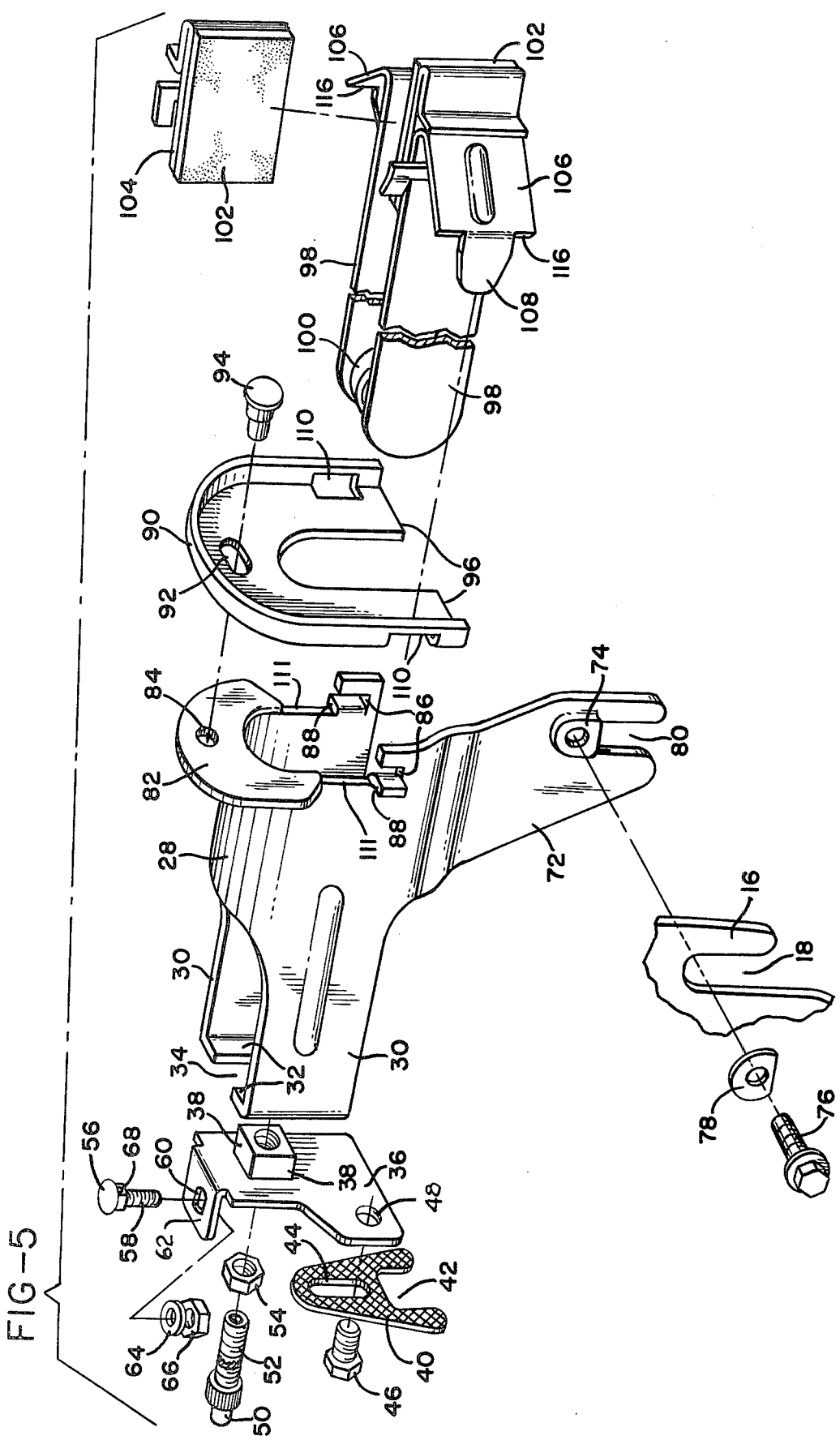

BICYCLE WITH SELF-ALIGNING DISC BRAKES

BACKGROUND OF THE INVENTION

The most common types of bicycle brakes are rim brakes, coaster brakes and disc brakes. Disc brakes provide certain advantages over the other two, more popular types of bicycle brakes and have, particularly in recent years, been the subject of increasing interest to bicycle designers and manufacturers as well as designers of brake systems generally. U.S. Pats. No. 2,612,968; 3,373,845; 3,655,015; 3,655,016; 3,675,740; and 3,675,741, for example, all deal with various types of disc brakes adapted for use with bicycles.

Generally, the above noted patents rely upon a rotary motion about an axis parallel to the axis of the brake disc to force the brake pads into engagement with the opposite faces of the brake disc. In most, this rotary motion is accomplished with a threaded member mounted for rotation about its axis and provided with a lever mounted on its outer end, so that upon rotation of the threaded member one brake pad is forced into engagement with a face of the brake disc, and by a reaction process the other brake pad is brought into engagement with the opposite face of the brake disc.

While a more direct applicaton of braking forces is considered more desirable, systems which provide a more direct applicaton of braking force appear to present problems with respect to accommodating variations of the bicycle disc from its ideal position with respect to the brake pads. Such variations may occur, for example, through normally accepted manufacturing tolerances or through bending or warping of the disc.

Thus, a need exists for a bicycle disc brake in which, not only is the braking action accomplished by a direct application of braking force, but one in which the brake is essentially self-aligning to accommodate for variations in the position of the brake disc with respect to the brake pads.

Additionally, it is desirable that such a braking system is capable of being mounted on the bicycle frame such that torque generated during the braking action is most efficiently transferred from the brake mechanism to the bicycle frame.

Further, it is highly desirable that such brakes are mounted on the bicycle frame in a manner which allows the wheel or wheels to be removed without removing or otherwise detaching the brake from the bicycle frame.

SUMMARY OF THE INVENTION

The present invention provides a bicycle disc brake which includes a brake mounting bracket attached to the bicycle framework and restrained against movement about the axle of the wheel with which the brake is associated during braking action. The mounting bracket is attached to the bicycle toe plate and a torque-resisting portion of the bracket extends along one of the bicycle frame members and engages the frame member adjacent an outer end of the torque-resisting portion.

The brake pads are carried by an actuator, which is in turn supported by a carrier. The carrier and brake mounting bracket are interconnected by a loose connection which permits floating movement of the carrier, actuator and brake pads with respect to the brake mounting bracket and brake disc to accomodate assembly tolerances and distortions in the brake disc and allow the brake pads to align themselves automatically with respect to the brake disc.

This may be accomplished by interconnecting the mounting bracket and carrier with a stud and oversize aperture connection, which allows twisting movement of the carrier relative to the mounting bracket and brake disc and also movement of the brake pads in a direction normal to the faces of the brake disc to accommodate variations in the position of the brake disc with respect to the brake pads. As noted above, the mounting bracket is attached to the toe plate of the bicycle and this attachment is such that it allows the wheel with which the brake is associated to be removed without necessitating removal of the brake from the bicycle.

The present invention, therefore, provides a self-aligning,bicycle disc brake which may be attached to the bicycle frame in a manner which permits efficient torque resistance during braking action, and which allows the bicycle wheel to be removed without disconnecting the brakes from the frame.

BRIEF DESCRIPTION OF THE DRAWINGS

FIG. 1 is an elevational view of a portion of a bicycle and the braking system of the present invention;

FIG. 2 is a view taken on line 2—2 of FIG. 1;

FIG. 3 is a view taken on line 3—3 of FIG. 1;

FIG. 4 is a view taken on line 4—4 of FIG. 1; and

FIG. 5 is an exploded view showing the main components of the brake of the present invention.

DESCRIPTION OF THE PREFERRED EMBODIMENTS

With reference to FIG. 1 of the drawings, it will be seen that a bicycle 10 in accordance with the present invention may include a pair of intersecting frame members 12 and 14 joined by a toe plate 16. The toe plate may be slotted, as at 18, to receive the threaded outer end 20 of the bicycle wheel 22 and a nut (not shown) is threaded on the member 20 to hold the wheel 22 in place in the slotted toe plate. Additionally, the wheel will be provided with bearings to allow it to rotate freely in the bicycle frame, all in a conventional manner.

Mounted on the bicycle frame in straddling relationship to a brake disc 24 carried by the wheel 22 is the brake system 26 of the present invention. The brake per se, as best seen in FIG. 5 of the drawings, includes a substantailly U-shaped mounting bracket 28 having forwardly extending legs 30 which constitute a torque-resisting portion and terminate in inturned portions 32 defining an open ended slot 34.

An L-shaped plate member 36 has welded to a rear face thereof a nut member 38 which is received in the slot 34. An A-shaped plate member 40 is slotted at its lower ends, as indicated at 42, and at its upper end, as indicated at 44, and receives a bolt 46 which is threaded in an opening 48 in the plate member 36.

A bowden cable 50, as also seen in FIG. 1 of the drawings, is threaded at one end 52 and received in the nut 38. A lock nut 54 is also threaded on the end 52 of the bowden cable to secure it in place in the plate member 36. An anchor bolt 56 is threaded at 58 and secured in a slot 60 in a forwardly extending portion 62 of the plate member 36 by means of a washer 64 and nut 66. An opening 68 is formed through the anchor bolt 56 to receive the wire 70 of the bowden cable 50.

The mounting bracket 28 also includes a downwardly and inwardly extending leg 72 which has an inverted, U-shaped portion 74 pressed outwardly thereof to be received in the slot 18 in the toe plate 16. A bolt 76 carrying a washer 78 is threaded in portion 74 to attach the lower end of the leg 72 to the toe plate 16.

The lower end of the leg 72 is also slotted, as at 80, and it will be noted from FIGS. 1 and 5 of the drawings that with the mounting bracket 28 attached to the toe plate the slots 18 and 80 are aligned. Thus, the wheel 22 can be removed from the bicycle frame without disturbing the brake 26.

Of course, it will be apparent that lower end of leg 72 might be provided with a bolt opening therethrough and simply bolted to the toe plate through a corresponding opening formed in the toe plate or through the slot 18. In this case there would be no need for the slotted, adjustable interconnection of the plate members 36 and 40, since the position of the mounting bracket 28 would not be fixed by the reception of the U-shaped portion 74 in the slot 18. The plates 36 and 40 could, therefore, be replaced by a single plate member extending downwardly from the mounting bracket 28 to the frame member 12.

However, with this construction it would be desirable to engage frame member 12 for two-way restraint against movement about axle 20. This could be accomplished by having a portion of the modified plate replacing plates 36 and 40 extend beneath as well as above frame member 12. With this construction braking during reverse movement of the bicycle as well as forward movement would be transferred directly to frame member 12.

As best seen in FIGS. 3 and 5 of the drawings, the mounting bracket 28 also carries a collar 82 adjacent an upper rear portion thereof having an opening 84 therethrough and a pair of slots 86 are formed by tabs 88 bent out of the plane of the bracket adjacent the central rear portion thereof.

A carrier 90 has an oversize aperture 92 formed therethrough and receives loosely a stud 94 which may consist, as shown in FIG. 5, of a rivet or the like 94 fastened in the opening 84 of the collar member 82, or simply a tang pressed out of the collar member and received loosely in aperture 92. Lower ends 96 of the carrier 90 are slidably received in the slots 86 of the mounting bracket to thereby provide, with the stud 94, a floating connection between the mounting bracket and the carrier 90.

A pair of plates 98 are joined adjacent their forward ends by a stationary sheave 100 and each of the plates 98 carries at its opposite end a brake pad 102 which may be attached thereto by means of a detachable clip 104. The particular manner of attaching the brake pads to the plates does not per se form part of the present invention and any convenient means of attaching the pads to their respective plates may be utilized in place of the clips 104.

Formed integrally with each plate 98 is an outwardly and forwardly extending member 106, each of which carries a forwardly projecting tab 108. The tabs 108 are received in slots 110 and extend through the slots 110 and into the notches 111 formed by the lower ends of the collar 82 and tabs 88. Preferably each unit 98–106 is formed of spring steel to provide, in effect, a resilient, hinged connection therebetween.

The wire 70 of the bowden cable 50 extends from its sheath at the plate member 36 and is trained around the stationary sheave 100 and anchored by means of the anchor bolt 56. The slot 42 in the A-shaped member 40 receives the frame member 12, as seen in FIGS. 1 and 4 of the drawings, and the slotted connection between the member 40 and the member 36 allows the member 40 to be adjusted to seat on the frame member 12 in the manner shown in FIGS. 1 and 4 of the drawings.

As noted above, this adjustability may be dispensed with if desired and plates 36 and 40 replaced by a single plate which engages frame member 12 on opposite sides thereof. Adjustability could then be provided with a simple bolted connection at the toe plate. In either case, by attaching the mounting bracket to the bicycle frame at two, widely spaced points, it will be seen that restraint against movement of the mounting bracket about axle 20 is provided.

With regard to the application of the brake, it will be seen that when a bracking force is applied on the wire 70 of the bowden cable 50 as indicated by the arrow 114 in FIG. 1 of the drawings, the two plates 98 will be drawn forwardly in the direction of the applied force generally parallel to the opposite faces of the disc 24. Portions 116 of each member 106 engage the rear face of the carrier 90 adjacent the slots 110 therethrough and, through the hingelike connection between the plates 98 and member 106, force the brake pads 102 into engagement with opposite faces of the brake disc 24.

Thus, instead of a reaction type braking system, the brake pads are drawn into engagement simultaneously by a direct application of force to each of the brake pads, and the braking force is applied through the wire 70 with a direct pull substantially parallel to the frame. Upon relaxation of the braking force applied through the wire 70 the resiliency of the units 98–106 will cause the pads 102 to back away from the faces of the brake disc.

The use of this construction is facilitated by providing a floating connection between the mounting bracket 28 and the carrier 90. As a result, should the disc 24 be warped from a planar configuraton or misaligned with respect to the brake pads, or both, it will be seen that the floating connection between the mounting bracket and the carrier allows the brake pads to align automatically with the opposite faces of the brake disc.

It will be seen, therefore, that the present invention provides a disc brake system for bicycles actuated by a direct applicaton of braking force on the brake components, which is self-aligning, and is attached to the bicycle frame for maximum resistance to braking torque without interfering with the removal of the bicycle wheel from the frame to which the brake system is attached.

While the forms of apparatus herein described constitute preferred embodiments of the invention, it is to be understood that the invention is not limited to these precise forms of apparatus, and that changes may be made therein without departing from the scope of the invention.

What is claimed is:

1. In a bicycle including a pair of intersecting frame members joined at the intersection thereof by a toe plate having an open ended slot formed therein, a wheel having an axle received in said open ended slot in said toe plate and a brake disc carried by and fixed with respect to said wheel, a pair of elongated plate members joined adjacent their forward ends, carrying brake pads adjacent their rear ends and having actuating means responsive to movement of said plate members longitudinally thereof to cause said brake pads to move into engagement with opposite faces of said brake disc, and a cable engaging said joined ends of said plate members to cause longitudinal movement thereof, the improvement comprising:
   a. a mounting bracket having an opposed pair of legs extending along one of said frame members and terminating in means forming an adjustable connection between said mounting bracket and said one of said frame members,
   b. said mounting bracket further including a downwardly extending leg extending beneath said toe plate and having an open ended slot therein in registration with said open ended slot in said toe plate,
   c. a U-shaped portion pressed outwardly of said downwardly extending leg and received in a portion of said slot in said toe plate inwardly of said axle of said wheel,
   d. said mounting bracket further including a generally flat collar portion lying substantially in a plane perpendicular to the plane of said brake disc,
   e. a carrier carrying said plate members, and
   f. means forming a floating connection between said carrier and said collar of said mounting bracket.

2. In a bicycle including a pair of angularly related frame members joined at the intersection thereof by a toe plate, a wheel having an axle mounted in said toe plate, a brake disc mounted for rotation with said wheel, a pair of elongated plate members disposed on opposite sides of said brake disc, said plate members being joined adjacent first ends thereof and carrying braking surfaces adjacent opposite ends thereof disposed adjacent opposite faces of said brake disc, and actuating means carried by said plate members for moving said braking surfaces thereof into engagement with said opposite faces of said brake disc upon movement of said plate members in a direction substantially parallel to said opposite faces of said disc, an improved brake mounting bracket comprising:
   a. means defining a slot and a member received and retained in said slot and forming a floating connection between said bracket and said plate members and permitting both twisting movement of said plate members, braking surfaces and actuating means with respect to said brake disc and bracket and movement of said plate members, braking surfaces and actuating means normal to said faces of said brake disc,
   b. an opposed pair of legs extending away from said toe plate along a first one of said frame members,
   c. means connecting said opposed pair of legs to said first one of said frame members at a point thereon spaced from said toe plate, and
   d. a downwardly extending leg extending away from said opposed pair of legs and secured to said toe plate.

* * * * *